(12) United States Patent
Oh

(10) Patent No.: US 9,291,252 B2
(45) Date of Patent: Mar. 22, 2016

(54) ALTERNATOR PULLEY, AND MOUNTING STRUCTURE OF ALTERNATOR PULLEY AND ALTERNATOR FOR VEHICLE

(71) Applicant: Hyundai Motor Company, Seoul (KR)

(72) Inventor: Wan Soo Oh, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 156 days.

(21) Appl. No.: 14/140,397

(22) Filed: Dec. 24, 2013

(65) Prior Publication Data

US 2015/0087455 A1     Mar. 26, 2015

(30) Foreign Application Priority Data

Sep. 25, 2013    (KR) ........................ 10-2013-0114051

(51) Int. Cl.
     *F16D 3/00*         (2006.01)
     *F16H 55/14*       (2006.01)
     *F16H 55/36*       (2006.01)

(52) U.S. Cl.
     CPC .......... *F16H 55/36* (2013.01); *F16H 2055/366* (2013.01)

(58) Field of Classification Search
     CPC .... Y10T 74/2128; F16F 15/145; F16F 15/14; F16H 2055/366; F16H 55/36
     USPC .......................................................... 474/94
     See application file for complete search history.

(56) References Cited

U.S. PATENT DOCUMENTS

| | | | | |
|---|---|---|---|---|
| 1,085,443 A | * | 1/1914 | Lanchester | ................... 74/572.2 |
| RE15,645 E | * | 7/1923 | Tibbetts | ........................ 74/574.2 |
| 1,627,917 A | * | 5/1927 | Masury | ........................ 74/574.3 |
| 1,718,208 A | * | 6/1929 | Anibal | ......................... 74/574.2 |
| 1,844,991 A | * | 2/1932 | Thomas | ....................... 74/574.2 |
| 2,346,972 A | * | 4/1944 | Kishline | ...................... 74/574.2 |
| 4,165,466 A | * | 8/1979 | Stikkers | ............................. 290/3 |
| 5,413,535 A | * | 5/1995 | Reik | ............................... 474/94 |
| 5,520,271 A | * | 5/1996 | Kohno et al. | ............... 192/30 V |
| 5,619,887 A | * | 4/1997 | Simpson | ..................... 74/574.2 |
| 5,697,261 A | * | 12/1997 | Mokdad et al. | .............. 74/574.4 |
| 5,976,020 A | * | 11/1999 | Lohaus et al. | ..................... 464/3 |
| 6,089,121 A | * | 7/2000 | Lohaus | ......................... 464/68.4 |
| 6,244,134 B1 | * | 6/2001 | Sudau | ........................... 74/572.2 |
| 6,427,656 B1 | * | 8/2002 | Drecq et al. | ............... 123/192.1 |
| 6,705,181 B2 | * | 3/2004 | Tabuchi et al. | ............. 464/68.91 |
| 7,004,294 B2 | * | 2/2006 | Williams | ...................... 188/378 |

(Continued)

FOREIGN PATENT DOCUMENTS

| | | |
|---|---|---|
| KR | 10-0222714 B1 | 7/1999 |
| KR | 20-0213834 Y1 | 12/2000 |
| KR | 10-2008-0035251 A | 4/2008 |

*Primary Examiner* — Henry Liu

(74) *Attorney, Agent, or Firm* — Morgan, Lewis & Bockius LLP

(57) ABSTRACT

An alternator pulley, a mounting structure of an alternator pulley, and an alternator for a vehicle are configured to reduce vibration by mounting an adaptor which includes a pendulum on the alternator pulley, by reacting a pendulum vibration with a belt vibration which have inverse phases to each other, and by completely press-fitting the adaptor to the alternator pulley without backlash. The alternator pulley, mounting structure and alternator may include a pulley body configured to be coupled with an alternator shaft and receiving power by a belt and an adaptor coupled with the pulley body and absorbs vibration caused by power delivery, wherein the adaptor may further include at least one pendulum for absorbing vibration caused by the power delivery.

7 Claims, 7 Drawing Sheets

(56) References Cited

U.S. PATENT DOCUMENTS

| | | | |
|---|---|---|---|
| 8,146,457 B2* | 4/2012 | Wright | 74/574.2 |
| 2002/0146326 A1* | 10/2002 | Kawaguchi et al. | 417/223 |
| 2002/0189393 A1* | 12/2002 | Tabuchi et al. | 74/573 R |
| 2003/0000377 A1* | 1/2003 | Kawata et al. | 92/70 |
| 2003/0000783 A1* | 1/2003 | Kanai et al. | 188/378 |
| 2003/0002991 A1* | 1/2003 | Kawata et al. | 417/222.1 |
| 2003/0012661 A1* | 1/2003 | Kawata et al. | 417/223 |
| 2003/0037636 A1* | 2/2003 | Kawata et al. | 74/574 |
| 2004/0149075 A1* | 8/2004 | Williams | 74/574 |
| 2009/0188463 A1* | 7/2009 | Wright | 123/192.2 |
| 2009/0197719 A1* | 8/2009 | Ali et al. | 474/94 |
| 2010/0175956 A1* | 7/2010 | Zadoks | 188/268 |
| 2010/0255943 A1* | 10/2010 | Cali et al. | 474/94 |
| 2012/0000446 A1* | 1/2012 | Venton-Walters et al. | 123/564 |
| 2012/0094791 A1* | 4/2012 | Lee | 474/94 |
| 2012/0295746 A1* | 11/2012 | Cali et al. | 474/94 |

* cited by examiner

ALTERNATOR PULLEY, AND MOUNTING STRUCTURE OF ALTERNATOR PULLEY AND ALTERNATOR FOR VEHICLE

CROSS-REFERENCE TO RELATED APPLICATION

The present application claims priority of Korean Patent Application Number 10-2013-0114051 filed Sep. 25, 2013, the entire contents of which application is incorporated herein for all purposes by this reference.

BACKGROUND OF INVENTION

1. Field of Invention

The present invention relates to an alternator mounted on an engine. More particularly, the present invention relates to an alternator pulley, and a mounting structure of an alternator pulley and an alternator configured to decrease belt vibration by mounting an adaptor which includes a pendulum.

2. Description of Related Art

In general, an alternator is mounted on a vehicle and generates electricity for charging a battery of the vehicle. Moreover, the alternator receives power from an engine by a connecting belt between an alternator pulley and a crankshaft pulley of the engine.

Meanwhile, the alternator pulley has greater torsional vibration than the crankshaft pulley because a rotation speed of the alternator pulley is more than twice as fast as a rotation speed of the crankshaft pulley.

FIG. 1 and FIG. 2 are schematic diagrams of a traditional alternator pulley system.

As shown in FIG. 1 and FIG. 2, FIG. 1 is a schematic diagram of a traditional solid type of alternator pulley system, and FIG. 2 is a schematic diagram of a traditional overrunning alternator decoupler (OAD) type of alternator pulley system. The traditional solid type of alternator pulley has an alternator shaft 11 made of a rigid body, so that an alternator 10 and an alternator pulley 12 are directly connected. On the contrary, the traditional OAD type of alternator pulley has the alternator shaft 21 inserted with a spring (OAD spring) therein, so that an alternator 20 and an alternator pulley 22 are connected by the spring.

Recently, the OAD type alternator pulley has been widely used because belt slip due to large vibration of the belt 13 which connects the alternator pulley 12 with the crankshaft pulley 14 occurs in the solid type of alternator pulley. The OAD type of alternator pulley has the effect of reducing an idle vibration compared to the solid type of alternator pulley because a vibration resonance point of the belt in the idle RPM range is decreased.

However, the idle vibration is only reduced in the idle RPM rather than in the entire RPM range, and a subharmonic vibration caused by nonlinearity of the spring even occurs in the idle RPM range.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for an alternator pulley, and a mounting structure of an alternator pulley and an alternator for a vehicle having advantages of reducing vibration by mounting an adaptor which includes a pendulum on an alternator pulley, by reacting a pendulum vibration to a belt vibration which have inverse phases to each other, and by completely press-fitting the adaptor to the alternator pulley without backlash.

Various aspects of the present invention provide for an alternator pulley for a vehicle that may include: a pulley body configured to be coupled with an alternator shaft and receiving power by a belt; and an adaptor coupled with the pulley body and absorbing vibration caused by power delivery.

The adaptor may further include at least one pendulum for absorbing vibration caused by the power delivery.

The pulley body may be configured to generate a vibration which has a predetermined frequency by the power delivery, and the pendulum may be configured to generate pendulum vibration which has a resonant frequency by rotation, wherein the resonant frequency of the pendulum vibration may be equal to the predetermined frequency of vibration.

The pendulum vibration and the vibration may have inverse phases to each other.

The adaptor may include: a cylindrical connecting portion which is coupled with the pulley body; a disk coupled with the connecting portion concentrically at one side of the connecting portion; and at least one pendulum mounted on a predetermined position of an exterior circumference of the disk.

A first spline may be formed on an interior circumference of the pulley body, and a second spline may be formed on an exterior circumference of the connecting portion, so that the adaptor may be splined to the interior circumference of the pulley body.

The first spline may have a constant width, and a width of the second spline may decrease in a constant ratio from one side to the other side.

The width of the second spline at a position apart from the one side by a predetermined distance may be equal to the width of the first spline.

Various aspects of the present invention provide for a mounting structure of an alternator pulley and an alternator for a vehicle, wherein the mounting structure may include: a pulley body configured to be coupled with an alternator shaft and receiving power by a belt; an adaptor coupled with the pulley body and absorbing vibration caused by power delivery; and a nut which is configured to be coupled with the alternator shaft so as to press-fit the adaptor into the pulley body.

The adaptor may include at least one pendulum for absorbing vibration caused by the power delivery.

The pulley body may be configured to generate vibration which has a predetermined frequency by the power delivery, and the pendulum may be configured to generate pendulum vibration which has a resonant frequency by rotation, wherein the resonant frequency of the pendulum vibration may be equal to the predetermined frequency of vibration.

The pendulum vibration and the vibration may have inverse phases to each other.

The adaptor may include: a cylindrical connecting portion which is coupled with the pulley body; a disk coupled with the connecting portion concentrically at one side of the connecting portion; and at least one pendulum mounted on a predetermined position of an exterior circumference of the disk.

A first spline may be formed on an interior circumference of the pulley body, and a second spline may be formed on an exterior circumference of the connecting portion, so that the adaptor may be splined to the interior circumference of the pulley body.

The adaptor may be configured to be splined and press-fitted completely to the pulley body without axial and radial backlash of the alternator shaft.

According to various aspects of the present invention as described above, a vibration may be reduced by mounting the adaptor which includes a pendulum on the alternator pulley and reacting a pendulum vibration to a belt vibration which have inverse phases to each other, so durability and fuel consumption of the vehicle may be improved by reducing the belt vibration in whole RPM range of an engine.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
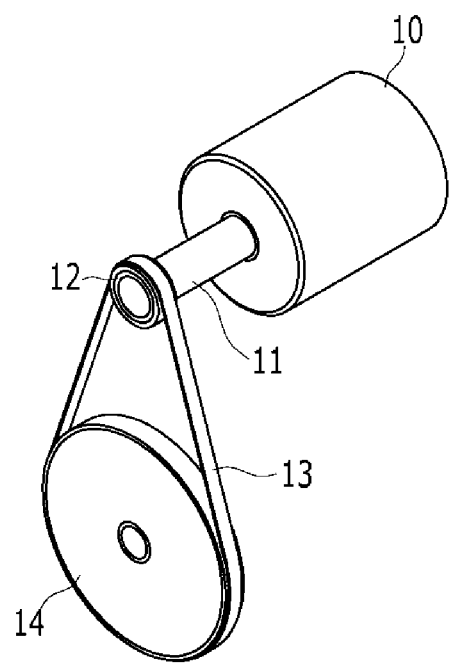
FIG. 1 is a schematic diagram of a traditional solid type of alternator pulley system.
Figure 2:
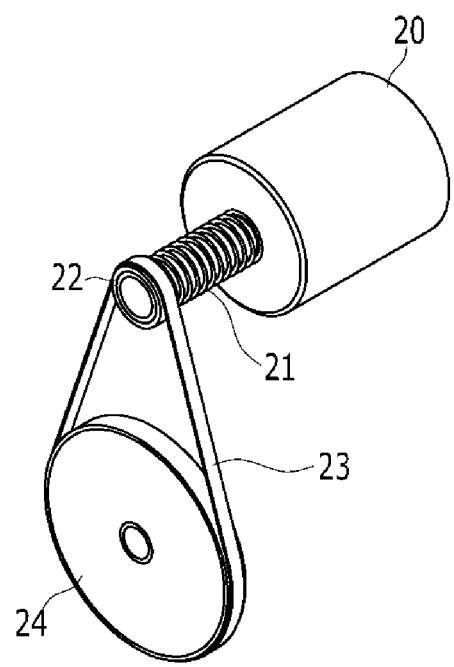
FIG. 2 is a schematic diagram of a traditional OAD type of alternator pulley system.
Figure 3:
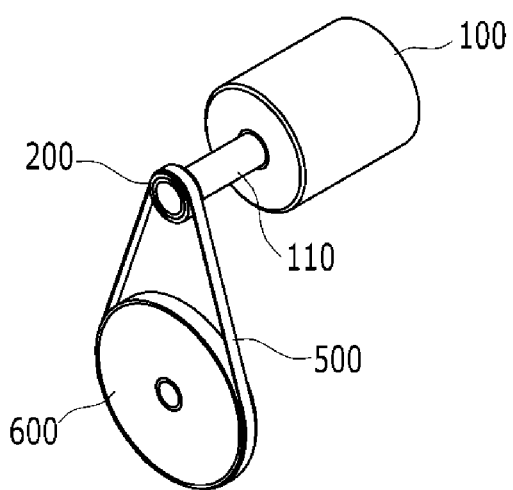
FIG. 3 is a schematic diagram of an exemplary alternator pulley system according to the present invention.
Figure 4:
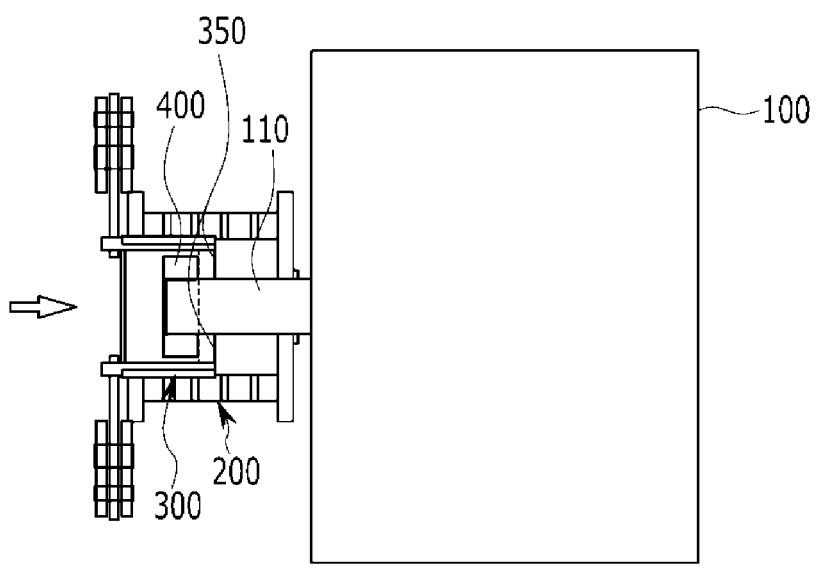
FIG. 4 is a cross-sectional view illustrating a mounting structure of an exemplary alternator and an alternator pulley according the present invention.
Figure 5:
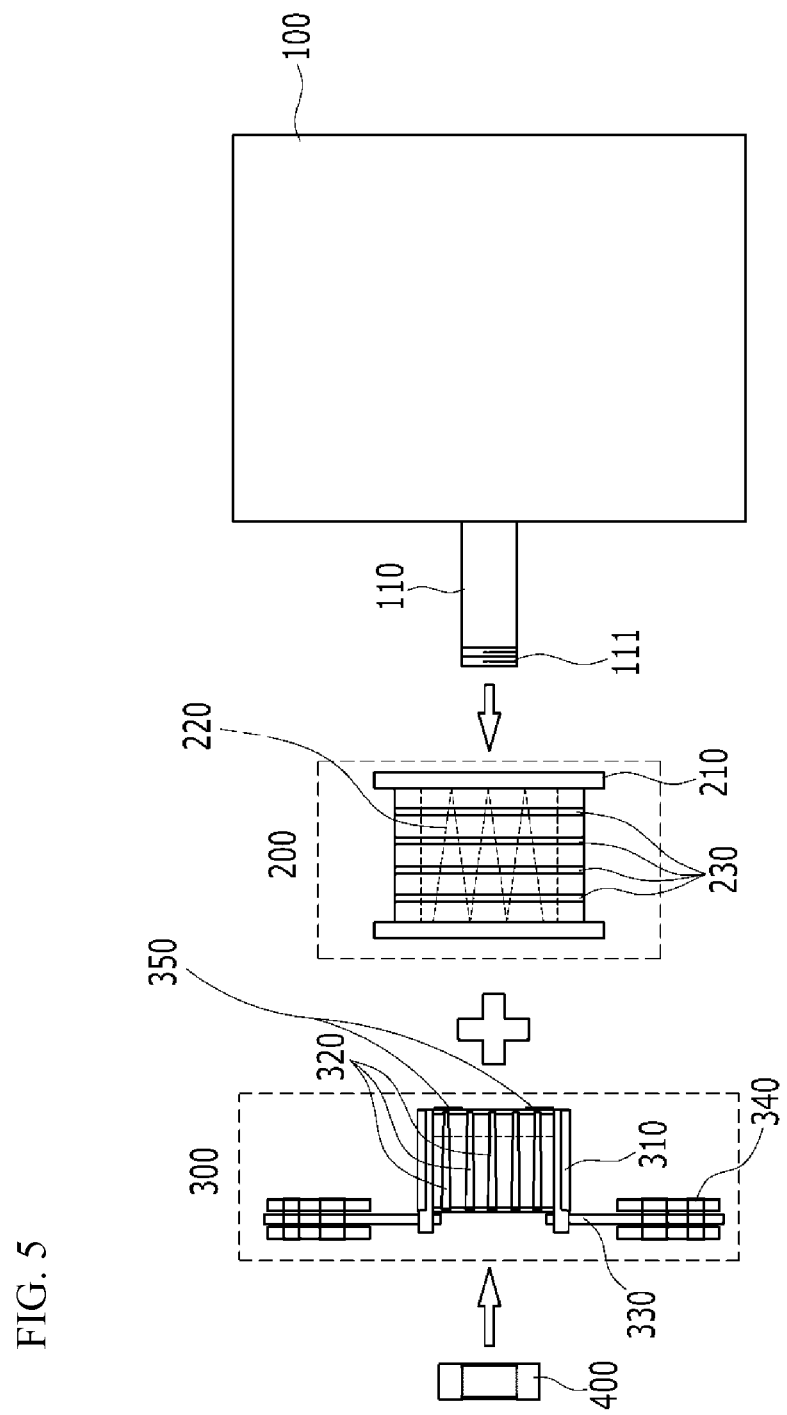
FIG. 5 is a cross-sectional view illustrating an exemplary process of being splined and press-fitted between an adaptor with a pendulum and a pulley body according to the present invention.
Figure 6:
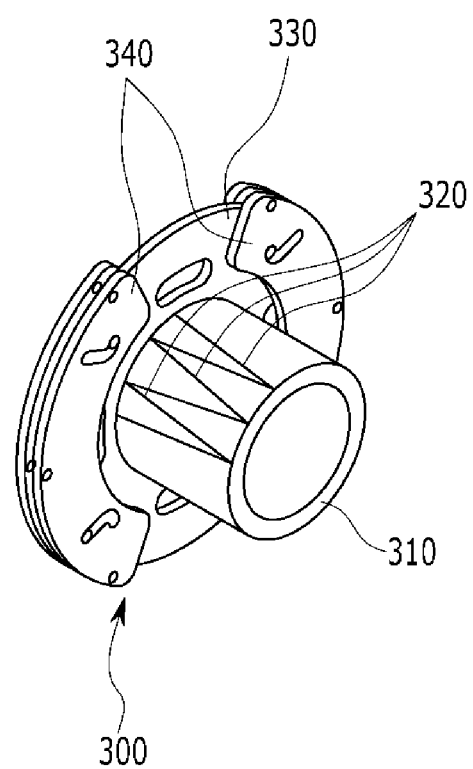
FIG. 6 is a schematic diagram of an exemplary adaptor which includes at least one pendulum according to the present invention.

FIG. 3 is a schematic diagram of an alternator pulley system according to various embodiments of the present invention, and FIG. 4 is a cross-sectional view illustrating a mounting structure of an alternator pulley and an alternator according to various embodiments of the present invention. FIG. 5 is a cross-sectional view illustrating a process of being splined and press-fitted between an adaptor with a pendulum and a pulley body according to various embodiments of the present invention. FIG. 6 is a schematic diagram of an adaptor which includes at least one pendulum according to various embodiments of the present invention.

The alternator pulley and the mounting structure of the alternator pulley and the alternator as shown in FIG. 3 to FIG. 6 is for better comprehension and ease of description, and the present invention may apply to a various alternator pulley system, but it is not limited thereto.

As shown in FIG. 3 to FIG. 6, according to various embodiments of the present invention, the alternator pulley and the mounting structure of the alternator pulley and the alternator include an alternator 100, a pulley body 200, and an adaptor with a pendulum 300.

The alternator 100 is a kind of a general motor, and the alternator 100 receives torque and converts to electricity. The alternator 100 is composed of an alternator main body and an alternator shaft 110, and the alternator shaft 110 is connected to the pulley body 200. A thread is formed at an end of the alternator shaft 110, so that a nut 400 can be screwed to the alternator shaft 110. In addition, a diameter of the alternator shaft 110 may be a diameter which can be screwed to a diameter of the nut 400.

The pulley body 200 is connected to the alternator 100 through the alternator shaft 110, and is connected to a crankshaft pulley 600 of an engine through a belt 500. That is, the belt 500 connected to the crankshaft pulley 600 is driven according to an operation of the engine, so the alternator 100 is driven and produces power by driving the alternator pulley 200 which is connected to the belt 500.

The pulley body 200 has a cylindrical shape, and the alternator shaft 110 may penetrate the pulley body 200. The pulley body 200 may be formed with one or more grooves 230 on an exterior circumference thereof for strongly connecting to the belt 500 by using frictional force, so a slip between the pulley body 200 and the belt 500 may be prevented. In addition, a diameter of both sides 210 of the pulley body 200 may be greater than a diameter of the pulley body 200 so as to prevent the belt 500 from escaping. A first spline 220 is formed on an interior circumference of the pulley body 200 in an axial direction, so that the adaptor with the pendulum is splined to the pulley body 200. The first spline 220 has a constant width in an axial direction.

As shown in FIG. 5 and FIG. 6, the adaptor with the pendulum 300 includes a connecting portion 310, a disk 330, and at least one pendulum 340.

The connecting portion 310 has a cylindrical shape, and a second spline 320 is formed on an exterior circumference of the connecting portion corresponding to the first spline 220 formed on the interior circumference of the pulley body 200. A width of the second spline 320 is changed in an axial direction. That is, the width of the second spline 320 may decrease in a constant ratio from one side to the other side, and the width of the second spline 320 at a position apart from the one side by a predetermined distance may be equal to the width of the first spline 220. The predetermined distance may be two thirds of the connecting portion's length. Therefore, the adaptor with the pendulum 300 may be press-fitted smoothly in an axial direction of the alternator shaft 110 as long as two thirds of the connecting portion's length. On the contrary, the adaptor with the pendulum 300 may be press-fitted tightly as long as one third of the connecting portion's length by decreasing the width of the second spline 320.

After the adaptor with the pendulum 300 is press-fitted into the pulley body 200, the adaptor with the pendulum 300 is fully press-fitted into the pulley body 200 by engaging the nut 400 with the thread 111 of the alternator shaft 110. For this purpose, a diameter of an interior circumference 350 of one side of the adaptor with the pendulum 300 is less than a diameter of an exterior circumference of the nut 400, so the nut 400 coupled with the thread 111 is supported by the interior circumference 350 in an axial direction.

If the adaptor with the pendulum 300 is fully press-fitted into the pulley body 200, axial and radial backlash of the alternator shaft 110 may be removed. Therefore, the nut 400 is prevented from escaping and has improved durability due to reducing impulsive vibration by removing backlash. In addition, in order to not allow the nut 400 to escape, the rotating direction while the nut 400 is connecting may be opposite to the rotating direction of the alternator shaft 110.

The disk 330 is coupled with the connecting portion 310 concentrically at one side of the connecting portion 310.

At least one pendulum 340 mounted on a predetermined position of an exterior circumference of the disk 330. The pendulum 340 may generate pendulum vibration which has the equal frequency to the vibration generated by the pulley body 200, but they have inverse phases to each other.

Hereinafter, the operation principle according to various embodiments of the present invention will be described in more detail.

Figure 7:
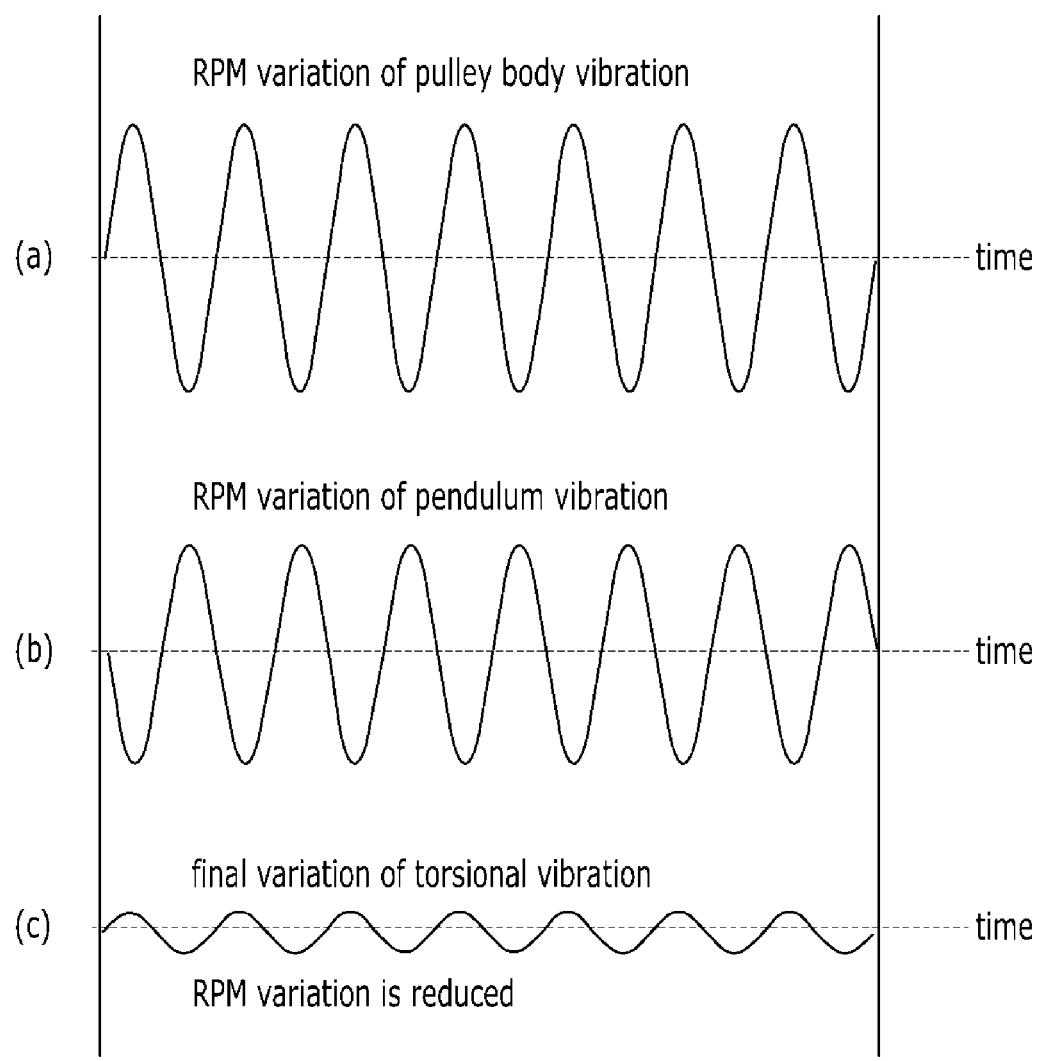
FIG. 7 is a graph showing an exemplary operation principle of reducing RPM variation according to the present invention.

FIG. 7 is a graph showing an operation principle of reducing RPM variation according to various embodiments of the present invention.

The pendulum 340 generates pendulum vibration which has a resonant frequency defined as in the equation below by rotation.

$$f_0 = \frac{1}{2 \cdot \pi} \sqrt{\frac{\Omega^2 \cdot R}{r}} = \frac{\Omega}{2 \cdot \pi} \sqrt{\frac{R}{r}}$$

Herein, $\Omega$ is angular speed, R is radius of the connecting portion 310, and r is distance between the connecting portion 310 and mass center of the pendulum 340.

The alternator pulley according to various embodiments of the present invention may countervail vibration generated by the pulley body 200 by using the pendulum vibration. That is, the vibration caused by power delivery in the pulley body 200 while the alternator pulley receives power by a belt 500 due to operation of the engine may have a predetermined frequency. In order to countervail the vibration efficiently, the pendulum 340 is designed to rotate and generate the pendulum vibration which has the equal frequency to the vibration from the pulley body 200, but they have inverse phases to each other.

An RPM variation according to vibration of the pulley body 200 from the belt 500 as shown in FIG. 7 (*a*) has an inverse phase to an RPM variation according to the pendulum vibration as shown in FIG. 7 (*b*). Therefore, a final variation of torsional vibration as shown in FIG. 7 (*c*) may be obtained by countervailing the RPM variation of FIG. 7 (*a*) and the RPM variation of FIG. 7 (*b*). That is, the vibration of the pulley body 200 caused by power delivery may be absorbed by designing it to have an inverse phase to the pendulum vibration.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A mounting structure of an alternator pulley and an alternator which generates electricity from transmitted power and includes an alternator shaft, the mounting structure comprising:
a pulley body configured to be coupled with an alternator shaft and receiving power by a belt;
an adaptor coupled with the pulley body and absorbing vibration caused by power delivery; and
a nut which is configured to be coupled with the alternator shaft so as to press-fit the adaptor into the pulley body.

2. The mounting structure of claim 1, wherein the adaptor includes at least one pendulum for absorbing vibration caused by the power delivery.

3. The mounting structure of claim 2, wherein the pulley body is configured to generate belt vibration which has a predetermined frequency by the power delivery, and the pendulum is configured to generate pendulum vibration which has a resonant frequency by rotation,
wherein the resonant frequency of pendulum vibration is equal to the predetermined frequency of belt vibration.

4. The mounting structure of claim 3, wherein the pendulum vibration and the belt vibration have inverse phases to each other.

5. The mounting structure of claim 1, wherein the adaptor comprises:
a cylindrical connecting portion which is coupled with the pulley body;
a disk concentrically coupled with the connecting portion at one side of the connecting portion; and
at least one pendulum mounted on a predetermined position of an exterior circumference of the disk.

6. The mounting structure of claim 5, wherein a first spline is formed on an interior circumference of the pulley body, and a second spline is formed on an exterior circumference of the connecting portion, so that the adaptor is splined to the interior circumference of the pulley body.

7. The mounting structure of claim 6, wherein the adaptor is configured to be splined and completely press-fitted to the pulley body without axial and radial backlash of the alternator shaft.

\* \* \* \* \*